Aug. 3, 1926.

S. S. MATTHES

CONDUCTOR SUPPORT

Filed Feb. 25, 1925

1,594,970

Inventor
SAMUEL S. MATTHES
By
Attorney

Patented Aug. 3, 1926.

1,594,970

UNITED STATES PATENT OFFICE.

SAMUEL S. MATTHES, OF MANSFIELD, OHIO, ASSIGNOR TO THE OHIO BRASS COMPANY, OF MANSFIELD, OHIO, A CORPORATION OF NEW JERSEY.

CONDUCTOR SUPPORT.

Application filed February 25, 1925. Serial No. 11,499.

My invention relates to a supporting device for conductors and particularly for supporting trolley conductors from a cross-span support or a catenary messenger cable.

One of the objects of my invention is to provide a device in which the trolley wire has extreme freedom of movement relative to the support so as to eliminate the so-called "hard spots" with respect to a moving current collector.

My invention resides in the new and novel construction, combination and relation of the various parts hereinafter fully described and disclosed in the accompanying drawing.

Figure 1:
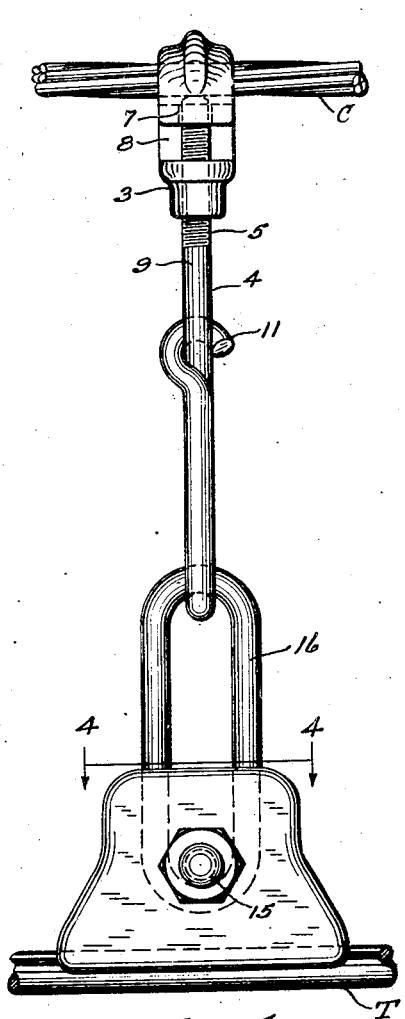
Fig. 1 is a side view in elevation of my invention and shown as secured to a cable support C and trolley conductor T.

In the preferred embodiment of my invention I employ a clamping member 1 to be secured to the cable C. The clamping member comprises a yoke-shaped member 2 having a boss 3 which is internally threaded to receive the link member 4 which is externally threaded at 5 to engage with the threads of the boss 3. The yoke member 2 is also provided with an inturned member 6 having a passage 7 therein to receive the end of the link member 4. The passage 7 may be threaded so as to cooperate with the threads 5 or it may be sufficiently large for free movement of the member 4 therethrough. The inturned portion 6 cooperates with the end of the link member 4 which prevents the yoke member 1 opening up under strain and permits stronger pressure of the end of the member 4 upon the cable C with a much lighter construction than would otherwise be possible. Having the two ends of the yoke member 2 cooperating with the link as shown, closes the passage 8 between the members 3 and 6 and prevents the member 1 from disengagement with the cable C should it become loose or originally installed loosely within the yoke member 2.

The member 4 is provided with a straight portion 9 as shown and a link member 10, the end 11 being so constructed as to be sprung over and interlocked at will with the portions 9 or 10 or at an intermediate point as shown, so as to form a closed or open link as desired.

In order to grip the trolley conductor T, I employ a clamping member 12 comprising two clamping members 13, which may be duplicates, and which are provided with lips 14 to engage the trolley conductor T, and I also employ the fastening device 15 which may comprise a bolt and nut as shown, or other suitable means for holding the clamping members 13 in clamping relation upon the trolley conductor T. Interposed between the clamping members 13 is a closed link 16 which is shown as interlocked with the fastening means 15 and is gripped within semi-circular grooves 17 or the equivalent. If desired, the grooves 17 may be sufficiently large so as to permit the member 16 to have some motion relative to the clamping member 12 and the member 16 may also be arranged to be positioned somewhat above the fastening member 15 so that it does not interlock therewith, but is still securely held in position between the clamping members 13 for the purpose required.

Figure 2:
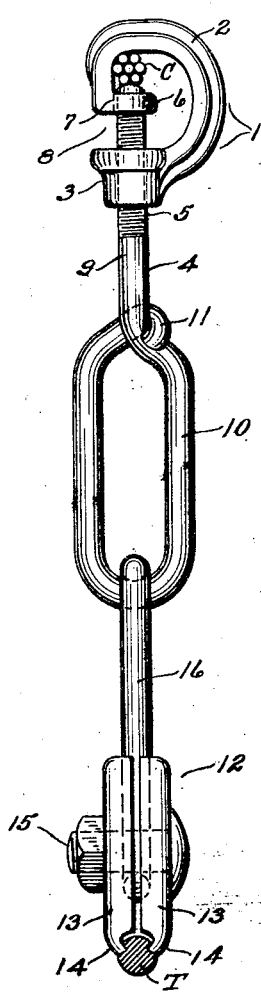
Fig. 2 is an end view of Fig. 1.

The members 10 and 16 are interlinked, as shown in Figs. 1 and 2, when the device is in use and are, therefore, inseparable, but have free relative movement so that the trolley conductor is free to move sideways or vertically relative to the cable C when pressure is applied to the trolley conductor T either from below or from the side.

Figure 3:
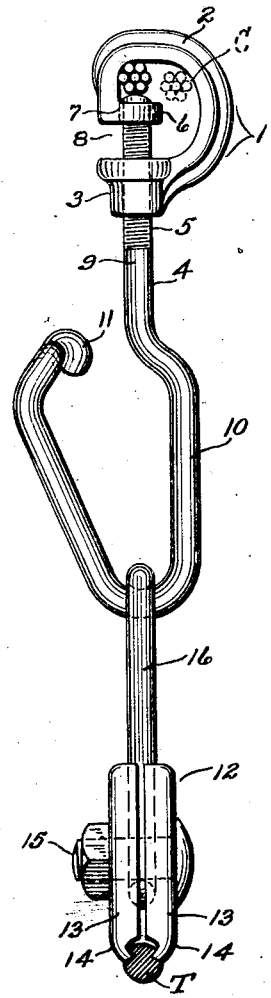
Fig. 3 is an end view of Fig. 1 with the exception that the parts are shown in such relation that they may be separated.
Figure 4:
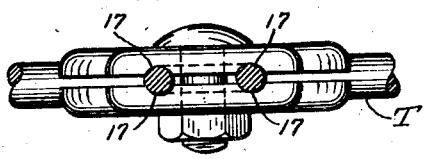
Fig. 4 is a sectional view of Fig. 1 on the line 4—4.

If it is desired at any time to disconnect the parts 12 and 16 from the part 4 without disturbing the connection to the cable C or the trolley T, it is only necessary to unlatch the member 11 so that it will spring open as shown in Fig. 3.

In applying my invention the part 1 is separated from the part 4 and is then hooked in position upon the cable C and then the part 4 is reassembled either with the other parts secured thereto or not. It is evident, of course, that if all the parts are together that the part 12 cannot be secured to the trolley conductor T when the part 4 is reassembled with the part 1, but if the part 12 has been assembled upon the trolley conductor T it is only necessary then to disconnect the part 12 from the part 4 in the manner already explained, and after the part 4 has been reassembled with the part 1 then the member 16 is interlinked with the member 10 and the member 11 is then interlocked as shown in Fig. 2.

There are, of course, modifications which will occur to those skilled in the art, but which will fall within the scope of my invention and, therefore, I do not wish to be limited other than by my claims.

I claim:

1. A conductor support comprising means to secure the device to a support, means to clamp a conductor, a member detachably secured to the last means in non-movable relation thereto, a member secured to the first means and interlinked with the first member for free relative movement and means to lock together and unlock the members at will.

2. A conductor support comprising means to secure the device to a support, means to clamp a conductor, a member detachably secured to the first means, a member detachably secured to the second means, the two members interlinked for freedom of relative movement and one member provided with means to lock the members together or unlock them at will without disturbing the first two means relative to the support and the conductor respectively.

3. A conductor support comprising means to secure the device to a support, means to grip a conductor, a closed link secured to the last means, means on the gripping means to receive the link and position the same, a member secured to the first means and provided with a link to be opened and closed at will and to interlock with the first link to secure the said means together.

4. A conductor support comprising means to secure the device to a support, a two part clamp to grip a conductor, a bolt to secure the clamp parts together and into clamping relation with the conductor, a link member secured between the clamp parts and held relatively immovable therebetween by the bolt, a link member secured to the said means and interlinked with the first said link member to secure the clamp in free movable relation to the support.

5. A conductor support comprising means to secure the device to a support, a two part clamp to grip a conductor, a bolt to secure the clamp parts together and into clamping relation with the conductor, a link member immovably secured between the clamp parts and interlinked with the bolt and means to secure the link member to the first said means in freely movable relation to the support and detachable from the link member without disturbing any of the other connections.

In testimony whereof I affix my signature.

SAMUEL S. MATTHES.